3,085,657
VARIABLE FREQUENCY VIBRATION ABSORBER
Carl O. Preis, Baldwin, N.Y., assignor to Hazeltine
Research, Inc., a corporation of Illinois
Filed Sept. 29, 1960, Ser. No. 59,433
4 Claims. (Cl. 188—1)

This invention relates to vibration absorbers and, more particularly, to a variable frequency vibrator absorber especially applicable to printed circuit boards.

It has been found that completed printed circuit boards with all components attached may have mechanical oscillation characteristics such that when subjected to conditions of vibration, excessive acceleration sufficient to damage the board assembly may result. In addition, when a printed circuit assembly has components changed in the field for repairs, for example, the mechanical oscillation characteristics may be changed sufficiently so that excessive accelerations will result even though such accelerations were not possible in the board as originally assembled. To date, it is not thought that any satisfactory solution to the problem of variable frequency vibration absorbtion has been proposed.

It is an object of this invention, therefore, to provide a new and improved variable frequency vibration absorber.

It is a further object of this invention to provide a composite printed circuit board having variable mechanical oscillation characteristics.

In accordance with the invention, a variable frequency vibration absorber comprises a spring, means for coupling the spring to a utilization device subject to undesirable mechanical oscillations, a mass coupled to the spring, means for varying the position of this mass with relation to the spring so as to adjust the natural frequency of the absorber and means for damping motion of the mass so as to attenuate the above-mentioned oscillations.

For a better understanding of the present invention, together with other and further objects thereof, reference is had to the following description taken in connection with the accompanying drawing, and its scope will be pointed out in the appended claims.

In the drawing:

FIG. 1a shows an end view of a variable frequency vibration absorber embodying the present invention and FIG. 1b is a sectional view of the absorber taken on line b—b of FIG. 1a.

Figure 1A:
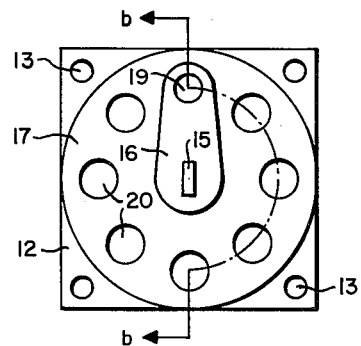
Figure 1B:
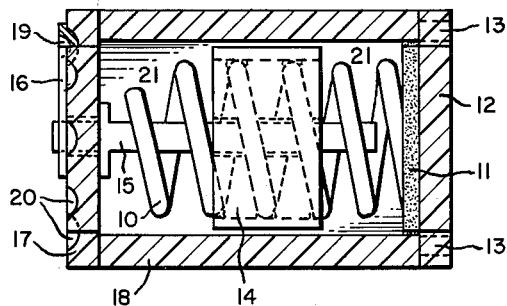

Referring to FIG. 1b of the drawing, the variable frequency vibration absorber illustrated includes a spring shown as the coil spring 10. The absorber also includes means for coupling the spring 10 to a utilization device, which may be considered as comprising adhesive material 11 and base 12 which includes holes 13 for attaching the absorber to a printed circuit board or other device. The absorber further includes a mass shown as the weights 14. This mass 14 is made up of two pieces, an inner weight which is grooved on its outer surface so as to accept the spring 10 and an outer weight which surrounds the inner weight and acts as a stabilizer and guide for the linear motion when the spring flexes. The absorber additionally includes means for varying the position of the mass 14 with relation to the spring 10. These means are shown as a flat control rod 15 which fits loosely into a substantially rectangular hole through the inner weight of mass 14 and flat springy arm 16 attached to the portion of the rod 15 which protrudes through a circular hole in the top cover 17 (17 acts as a cover for the cylindrical tube 18). Arm 16 has a substantially hemispherical protrusion 19 which is adapted to rest in one of the substantially hemispherical indentations 20 formed in top cover 17. The absorber finally includes means for damping motion of the mass 14. The illustrated absorber is designed to use a fluid, such as mineral oil, for this purpose and the oil is put into the complete absorber so as to partially fill the space 21. In other designs, a gas or different type of liquid, filling or partially filling the space 21, may be used as this means. The combination of the mass 14 and the wall of the tube 18 may also be relied upon as this means for damping motion; the friction between these two members, when relative motion is present, being efficient to dissipate energy.

In the illustrated arrangement the spring 10, rod 15 and arm 16 may be constructed of steel, the adhesive 11 may be any material suitable to securely fasten the end of the spring 10 to the base 12, and the base 12, cover 17 and tube 18 may be of a plastic material. These materials are stated for purposes of example only and any appropriate materials may be used.

The complete absorber is assembled so that the spring 10 has its lower end secured firmly by means of the adhesive 11 to the enclosure formed of the base 12, cylinder 18 and cover 17. The mass 14 encloses the spring 10, it being arranged that rotation of the mass 14 causes it to ride up or down on the spring 10. Control rod 15 is firmly affixed to the arm 16, the construction being such that this combination of rod 15 and arm 16 can rotate in the hole through the cover 17 as protrusion 19 is moved to different ones of the indentations 20, but substantially no movement in a direction perpendicular to the cover 17 is possible. Since the rod 15 fits loosely through the rectangular hole in the mass 14, any rotation of the rod 15 causes a corresponding rotation of the mass 14, resulting in a movement of the mass 14 up or down along the spring 10.

The above-described rotation and movement of the mass along the spring during adjustment of the natural frequency of the absorber is not involved in the actual operation of the device as a vibration absorber. During operation, mechanical oscillations of a utilization device are coupled to the absorber where damping of the resulting motion of the mass 14 and spring 10 dissipates the oscillatory energy available, thereby attenuating the oscillations of the utilization device.

Figure 2:
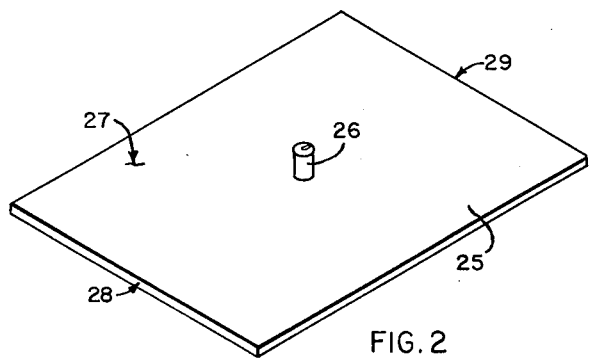
FIG. 2 is a view of a composite printed circuit board utilizing a variable frequency vibration absorber, such as that shown in FIGS. 1a and 1b.

Referring now to FIG. 2 there is shown a composite printed circuit board having variable mechanical oscillation characteristics. This composite board includes a printed circuit board 25 which, although not illustrated, includes on surface 27 the various components and conductors common to printed circuits. The composite board, which is arranged to be supported along the edges 28 and 29, further includes a variable frequency vibration absorber 26 mounted on the board 25. This absorber is constructed as described with reference to the absorber of FIGS. 1a and 1b, except that here the absorber is shown as having a circular base (corresponding to square base 12 in FIG. 1a) which is simply glued to the board 25 by a suitable adhesive. In utilizing this arrangement, the weights 14 of the vibration absorber are adjusted so as to set the working length of the spring 10. By "working length" is meant substantially the portion of the spring 10 existing between the weights 14 and the adhesive material 11. Such adjustment causes a change in the spring-constant to mass-ratio of the absorber and therefore in the natural frequency of the absorber. Hence, by controlling this ratio, the main load (the printed circuit board in this case) can be made to have a minimum acceleration. Any reasonable change in the resonance characteristics caused by altering the circuitry or components of the printed circuit in the field can be accommodated by this adjustment.

In one arrangement similar to that shown in FIGS. 1a and 1b, the entire vibration absorber was approximately ¾ inch in height and ½ inch in diameter and was designed to attenuate mechanical oscillations at about 200 cycles per second occurring in a printed circuit board. This absorber was effective to greatly reduce the magnitude of mechanical oscillations occurring at the critical frequency of about 200 cycles per second in this particular printed circuit board.

The absorber is illustrated as using a coil spring, but it will be appreciated that the invention is equally applicable to leaf springs or other types of spring and mass arrangements. Many other mechanical equivalents are applicable, for example, a lock nut arrangement might be substituted for arm 16 to allow adjustment of the absorber.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A variable frequency vibration absorber comprising: a spring; means for coupling said spring to a utilization device subject to undesirable mechanical oscillations; a mass coupled to said spring; means for varying the position of the mass with relation to said spring so as to adjust the natural frequency of the absorber; and means for damping motion of the mass so as to attenuate said oscillations.

2. A variable frequency vibration absorber comprising: a coil spring; means for coupling one end of said spring to a utilization device subject to undesirable mechanical oscillations; a mass coupled to said spring; means for varying the position of the mass with relation to said spring so as to adjust the natural frequency of the absorber; and fluid means for damping motion of the mass so as to attenuate said oscillations.

3. A variable frequency vibration absorber comprising: a spring; means for coupling said spring to a utilization device subject to undesirable mechanical oscillations; a mass coupled to said spring; means for varying the position of the mass with relation to said spring so as to adjust the natural frequency of the absorber; means for enclosing said spring and mass and for holding the mass in a desired position with relation to said spring; and fluid means for damping motion of the mass so as to attenuate said oscillations.

4. A variable frequency vibration absorber comprising: a spring; means for coupling said spring to a utilization device subject to undesirable mechanical oscillations; a weight coupled to said spring; means for moving the weight along said spring so as to change the spring constant to mass ratio of the absorber; and means for damping motion of the weight so as to attenuate said oscillations.

References Cited in the file of this patent

UNITED STATES PATENTS

| | | |
|---|---|---|
| 1,744,332 | Paton et al. | Jan. 21, 1930 |
| 1,997,423 | Loser | Apr. 9, 1935 |
| 2,367,709 | Arkus-Duntov et al. | Jan. 23, 1945 |
| 2,838,137 | Wallerstein | June 10, 1958 |
| 2,960,189 | Osburn | Nov. 15, 1960 |